United States Patent [19]

Ziemer

[11] Patent Number: 4,875,360

[45] Date of Patent: Oct. 24, 1989

[54] METHOD AND DEVICE FOR CHECKING FILTERS

[75] Inventor: Wolf Ziemer, Berlin, Fed. Rep. of Germany

[73] Assignee: Fläakt AB, Nacka, Sweden

[21] Appl. No.: 189,240

[22] Filed: May 2, 1988

[30] Foreign Application Priority Data

May 7, 1987 [DE] Fed. Rep. of Germany ....... 3715214

[51] Int. Cl.⁴ .............................................. G01M 3/20
[52] U.S. Cl. .......................................... 73/40.7; 73/38
[58] Field of Search ....................... 73/40.7, 38, 863.58

[56] References Cited

U.S. PATENT DOCUMENTS

| | | | |
|---|---|---|---|
| 3,765,225 | 10/1973 | Rivers | 73/40.7 |
| 4,494,403 | 1/1985 | Bowers et al. | 73/40.7 |
| 4,683,762 | 8/1987 | Aurich | 73/40.7 X |

Primary Examiner—Stewart J. Levy
Assistant Examiner—Joseph W. Roskos
Attorney, Agent, or Firm—Dann, Dorfman, Herrell & Skillman

[57] ABSTRACT

In a method for checking filters for permeability, in particular for the presence of leaks or other faulty zones which have increased permeability in comparison with other filter zones for particles to be filtered from an air or gas stream, air or gas charged with such particles as applied to one surface of the filter and the other side of the filter is scanned with an indicator system indicating the penetration of particles. The method is arranged in such manner that zonewise scanning of the reverse filter surface takes place by means of a suction nozzle, that upon entrance of a particle flow into the suction nozzle a measuring device arranged in the flow path is separately influenced by the particle flow for each scanned region, and that the result for each scanned region emitting a particle flow is indicated separately. A device for carrying out the method comprises a scanning station having an aerosol chamber and a scanning unit suitable for zonewise scanning of a surface and responsive to an aerosol flow, between which is arranged a receiver for the filter to be checked.

20 Claims, 3 Drawing Sheets

METHOD AND DEVICE FOR CHECKING FILTERS

The invention relates to a method for checking filters for permeability, in particular for leaks or other faulty zones which are of elevated permeability in comparison with other filter regions in respect of particles to be filtered from an air or gas flow, one surface of the filter being subjected to air or gas comprising such particles and the opposite surface of the filter being monitored with an indicator system signalling the passage of particles. Furthermore, the invention relates to a device for carrying out this method.

Clean work rooms and other clean rooms should to a particularly high degree be free of dust and other polluting suspended particles. For filtering the air for such rooms, filter paper is used which consists of micro-glass fibers. Papers of this type are known under the designations HEPA-Paper and ULPA-Paper. In the fabrication of these papers, the problem exists that on the one hand pores must remain which permit the penetration of the medium to be filtered but on the other hand holes of very small diameter, so-called pin holes, should be prevented. The more stringent the requirements of purity for the filtered medium, the less are such pin holes acceptable by the user.

Filter papers for such applications must therefore be checked before use to ensure that they are free of pin holes and have the necessary quality in respect of their filter characteristics over their entire surface.

For checking filter papers for pin holes a method is already known of the type described in the introduction in which an aerosol photometer is employed as an indicator for detecting the pin holes. This method however permits only the detection of pin holes down to a minimum diameter of 300 to 500 microns. In order to identify substantially smaller pin holes it cannot be employed and therefore does not meet the requirements for checking filter papers for extremely small leaks or other faulty zones.

Also known is the so-called oil fiber test with which pin holes can be detected down to a minimum size of 100 to 200 microns. This method is however time consuming and likewise does not satisfy stringent requirements.

The invention is therefore based on the object of providing a method and a device which permits the detection of pin holes of extremely small diameter.

With the solution according to the invention, the advantage is achieved that even pin holes having a diameter of only a few microns may be detected in filter papers. In this connection, the method according to the invention and the device according to the invention operate reliably and rapidly. The performance and operation is very simple for the user.

Further embodiments of the invention may be seen from the subsidiary claims.

An exemplary embodiment of the invention will be described in more detail with reference to the accompanying drawings, in which.

The illustrated filter checking installation comprises a cupboard-like housing 1 which is formed from a stable, twist-resistant frame of profiled aluminium sections and cladding of plates and has on the front panel a sight window 2 which may be opened by pivoting or sliding.

Figure 1:
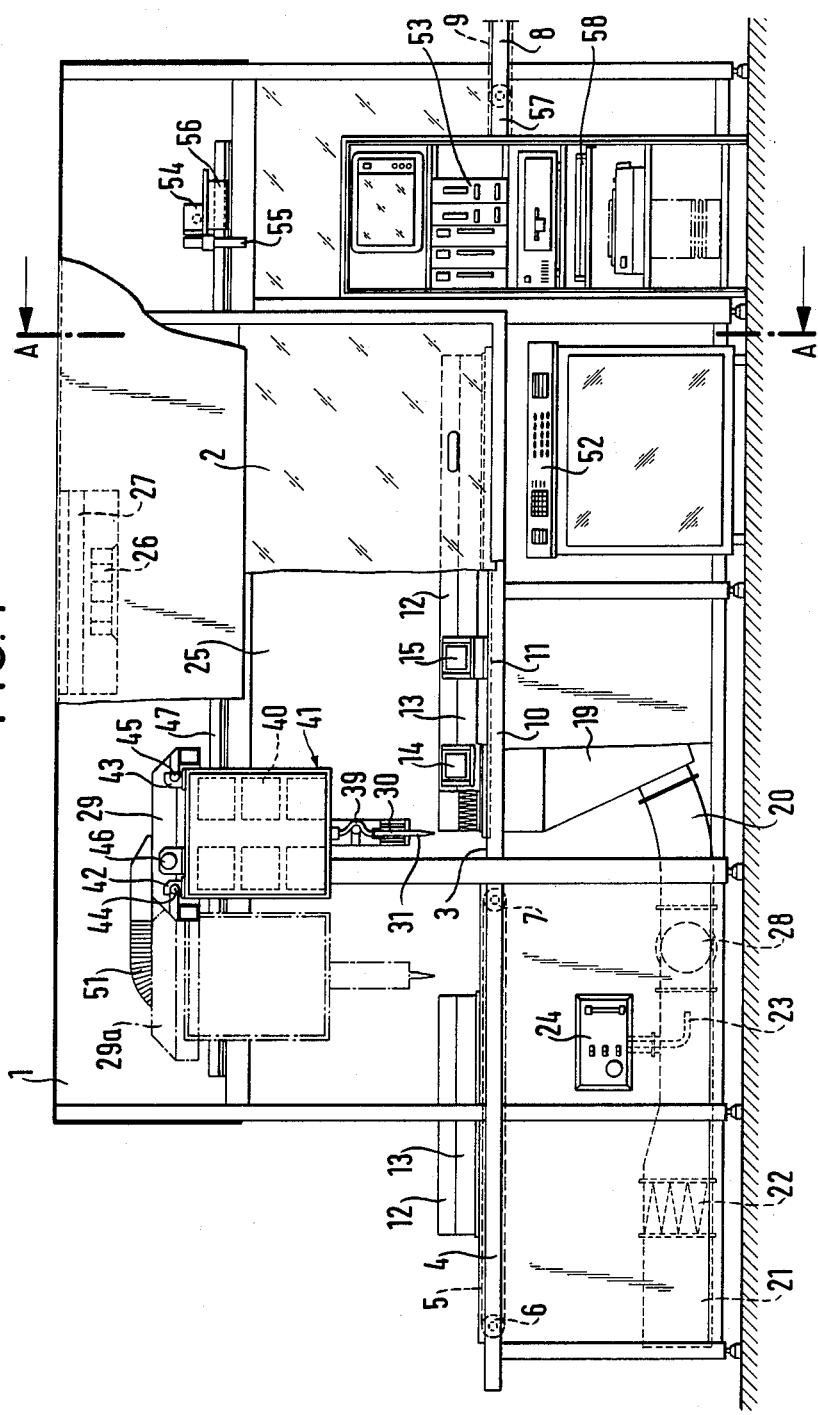
FIG. 1 shows a longitudinal section through a filter checking installation.

Approximately at table height is provided in the housing 1 a horizontal conveyor belt 3 for the filters which are to be checked. At the end of the conveyor belt 3 to the left in FIG. 1, is located an input station 4 having an endless conveyor belt 5 which runs over rollers 6,7 and is connected to a drive unit, not illustrated, for operation. At the righthand end of the conveyor belt 3 in FIG. 1, is provided an output station 8 which is constructed in an analogous manner to the input station 4 and likewise has a circulating conveyor belt 9 connected to the drive unit. Between the input station 4 and the output station 8 is located in the path of the conveyor belt a sensing station 10 having a window-like filter receiver 11.

The filters 13 to be checked are inserted in the filter frames 12 open on both sides, whose interior dimensions are adapted, possibly with the use of a mount, to the format of the respective inserted filter 13.

Filter frames 12 loaded with filters 13 are loaded onto the conveyor belt 5 of the input station 4 for introduction into the apparatus. For further transport of the filter frame 12 to the filter receiver 11 of the sensing station 10 and for exact positioning for the sensing step, transport and tensioning units 14,15 are provided with endless circulating conveyor belts 16,17 which are driven by DC motors 18. The transport and tensioning units can be pivoted by 90° around their axes so that after reaching the position across the filter receiver 11, the filter frames 12 can be lowered onto this. A rubber seal surrounding the window-like filter receiver 11, not illustrated in the drawing, ensures that after lowering the filters to be checked sit in an airtight manner on the filter receiver 11.

Beneath the filter receiver 11 of the sensing station 10 is located an aerosol chamber 19 having an aerosol feed channel 20. This is connected to a feed system. It consists of an air suction pipe 21, a particle filter 22 on the pressure side and a stepless radial ventilator of known type, whose rotational speed can be regulated, which is not illustrated. Into this feed system, discharges an aerosol inlet 23 by which the filtered air is mixed with an aerosol from an aerosol generator 24.

Across the plane of the filter receiver 11 and thus across the plane of the respective filter is located an exhaust chamber 25 from which the aerosol containing air is fed back out of the checking installation via a particle filter 27 by means of a radial ventilator 26 after passage through the window of the filter receiver 11 and possibly through the filter arranged there. During filter transfer, i.e. when the filter receiver 11 is not occupied, the aerosol containing feed air can be fed directly into the discharge chamber by means of a changeover flap 28 in the feed system. This enables continuous operation of the aerosol generator during transfer of the filter 2 and from the filter receiver 11 for maintaining a time stable aerosol distribution and aerosol concentration.

Figure 2:
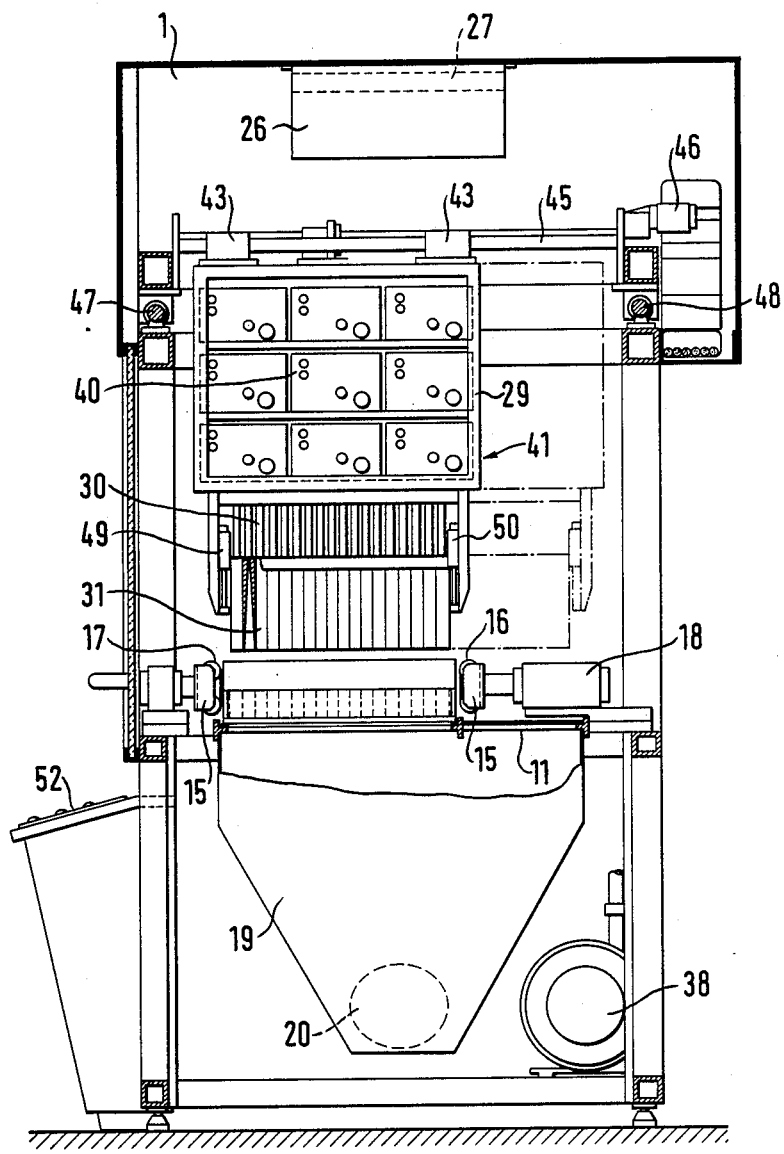
FIG. 2 shows the content of FIG. 1 in cross-section along the line A—A at an enlarged scale.

Furthermore, the sensing station 10 comprises an adjustable sensing unit 29. It comprises a nozzle plate 30 (FIG. 2) on which in the illustrated exemplary embodiment 18 mutually identical suction nozzles 31 are secured next to each other in a row transversely of the filter transport direction. Each suction nozzle 31 is 30 mm wide so that the assembly of nozzles consisting of 18 individual nozzles has an overall width of 540 mm.

Figure 3:
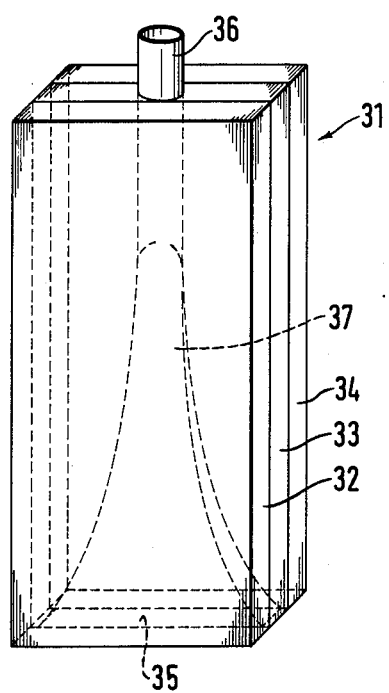
FIG. 3 shows a suction nozzle of the apparatus of FIGS. 1 and 2 at an enlarged scale.

As may be seen in more detail from FIG. 3, each suction nozzle 31 consists of three superimposed and mutually connected lamella-like plates 32,33,34 of AlMgSi 0.5. The middle plate 33 is shaped in such manner that between the discharge nozzle 35 at the inlet side and the pipe member 36 at the outlet side there exists a flow channel 37 which tapers in the form of an exponential curve towards the pipe member 36. The formation as an exponential channel ensures continuous acceleration of the flow in the nozzle and prevents boundary layer breakdown and turbulence, i.e. particle losses in the channel. The cover plates 32, 34 are ground at a sharp angle below 15° on one side at the exterior of the nozzle mouth (with a radius less than 0.1 mm) in order to minimise particle impact on the nozzle parameter.

The material selection for the nozzle plates 32,33,34 ensures electrostatic neutrality and their surfaces are mechanically polished, electrolitically polished and naturally anodised.

The suction nozzles 31 connected to a vacuum pump 38 via conduits which are not illustrated are isokinetic and are designed in the illustrated exemplary embodiment for a sample volume flow of 25 cm$^3$/s. The isokinetic flow speed in the nozzle mouth is about 0.52 m/s.

The suction nozzles 31 are each connected to a particle counter 40 via a respective Tygon tube 39 which is smooth, diffusion-tight, antistatic and flexible and is attached to the relevant pipe member 36. The particle counters 40 are constructed in known manner and therefore are not illustrated in more detail in the drawings. Preferably, condensation nucleus counters are employed as particle counters as marketed for example by the firms TSI Inc, St. Paul, USA, and TSI GmbH, Aachen, under the type designation TSI-CR/CnC Model 3760. These are particle counters which measure in the diameter range of particles between 0.01 and 0.02 microns both very high and also very low concentrations with the same reliability, thus with high counting efficiency.

The particle counters 40 are mounted in front of each other in arrangements of in each case 3×3 units in a frame 41. The frame 41 is suspended with hollow cylindrical bearings 42,43 on two tubular runners 44,45 which are arranged transversely of the filter transport direction in the upper part of the housing 1. By means of an electromotor 46, the frame 41 is displaceable on the rails 44,45. On the other hand, the rails 44,45 are displaceable by means of a DC motor which is not illustrated in rails 47,48, which are arranged parallel to the filter transport direction in the housing 1. The frame 41 is thus adjustable in two coordinate directions.

The nozzle plate 30 with the suction nozzles 31 is suspended on the frame 41 and by means of vertical guides 49,50 is adjustable perpendicularly to the plane of the filter transport path 3, for which reason the tube connections 39 between the nozzles 31 and the particle counters 40 are flexible.

The sensing unit 29 constructed from the sensing nozzles 31 and the associated particle counters 40 is thus adjustable as a whole both parallel to the filter transport direction (x-coordinate) and also transversely thereto (y-coordinate) across the filter 13 positioned in the sensing station 10 for performing a scanning movement.

The discharge system of the particle counters 40 discharges into a common discharge conduit of the vacuum pump 38. This conduit and the electrical connections which are likewise not illustrated and data cables of the particle counters 40 are secured in the scanning movement of the sensing unit 29 by a protective conduit 51 not illustrated in detail.

In the illustrated embodiment of the invention, the maximum filter area which can be sensed is 900×1800 mm. Filters of this format are scanned in this connection in the double path method, i.e. the nozzle plate 30 travels from the start position x=0 mm first to the position x=1800 mm across the filter 13 positioned in the sensing station 10, the position y=0 mm being maintained for the scanning nozzles 31. Thereafter, the nozzle plate 30 travels in the position x=1800 mm from the position y=0 mm into the position y=300 mm, whereupon the scanning nozzles 31 is returned from the position x=1800 mm into the position x=0 mm.

In contrast, with a filter size of 600 mm width, it suffices to move the sensor unit 29 only in the x direction without subsequent adjustment in the y direction.

The scanning speed in the x direction can be adjusted between 1 and 20 mm/s in the illustrated exemplary embodiment. Positional accuracy is less than or equal to 100 microns.

The control of the drive for the automatic or semi-automatic filter transfer from the filter conveyor belt 3 is performed by means of a console 52.

Evaluation of the measurement results determined by the particle counters 40 in the filter scanning is achieved by means of a computer 53 including a storage system, which preferably is constructed as a PC and to the data inputs of which the data outputs of the particle counters 40 are connected via cables which are not illustrated. For transferring the measurement results of the particle counters 40 to the computer 53, a multiplex circuit known per se can be provided so that between the particle counters 40 and the computer 53 only a single data line is provided.

In addition to the measurement results, the computer 53 also receives a report of the respective position of a leak zone in the scanned filter 30 indicated by the response of a particle counter 40, the x position being determined by the incremental rotation generator of the DC motor for the adjustment of the sensing unit 29 in the x direction, whilst the y position is defined by the center of the suction nozzle 31 of the respective responding particle counter 40, possibly having regard to the transverse adjustment of the sensing unit 29 between forward stroke and reverse stroke.

The positions of leaks in the scanned filter thus determined and stored by the computer 53 are supplied for indication to an indicator unit 54 which is formed in the described exemplary embodiment by a laser indicator 55. The laser indicator 55 is mounted in the y direction on a linear stand 56 and is arranged for displacement in the x direction on the same rails 47,48 on which also the sensing unit 29 is mounted. The laser indicator 55 is adjustable in the x and y directions in the same manner as the sensing unit 29.

In FIG. 1, the indicator unit 54 is located in a park position. For the indication process it is displaceable on the through-going rails 47,48 to a position which lies across the filter remaining in the sensing station 10. For this purpose it is however necessary previously to drive the sensing unit 29 on the rails 47,48 into a park position 29a illustrated in FIG. 1 in broken lines.

Instead of this, the sensing unit 29 and the indicator unit 54 can also remain in the positions illustrated in FIG. 1 if a separate indicator station 57 is provided for the filter 13 to be checked in the transport path after the sensing station 10, which separate indicator station 57 is to be provided beneath the indicator unit 54 in the position illustrated in FIG. 1. In this case, the position illustrated in FIG. 1 for the indicator unit 54 is its working position, for which reason in this embodiment the computer 53 is arranged next to the filter conveyor belt 3 in a projecting housing.

For display of the error zones determined by the system, the laser writer 55, controlled by the computer 53 assumes sequentially positions which correspond to the positions of the error locations in the scanned filter determined by the sensing unit 29. These positions are displayed optically on the filter by the laser beam directed downwardly from the laser indicator 55.

The energy and diameter of the laser beam of the laser indicator 55 can be set for the characteristics of the filter paper of the filter to be scanned for leaks in a suitable manner such that during the indication process no pin holes are inadvertently burnt in the filter. A suitable laser is for example a helium neon device, 5 mW, 0.75 mm beam diameter.

The control units for the sensing movements of the sensing unit 29 and for the computer 53 and for the laser indicator 55 are mounted together with the computer 53 and its terminals (display screen, printer etc) in or on a further console 58 of the housing 1.

The mode of operation of the installation according to the invention is as follows:

If a filter is to be checked for the possible presence of leak zones which usually cannot be recognized visually, in particular for the presence of pin holes, it is inserted into a filter frame 12 and brought with this via the input station 4 into the sensing station 10 where it lies with its lower side on the open window of the aerosol chamber 19 formed by the filter receiver 11. At this position, aerosol rich air from the aerosol chamber 19 pushes through the filter predominantly at those positions at which it has leaks in the form of pin holes or other regions of increased penetration. In contrast, aerosol particles are able to flow through the remaining regions of the filter surface only to a small extent as a result of the filter action so that in these regions normal ultralow penetration of aerosol particles takes place. Thus, leak zones emit a clearly stronger stream of aerosol particles.

When the sensing movement of the sensor unit 29 is initiated, the suction nozzles 31 of the nozzle plate 30 suck in a relatively large proportion of aerosol particles from the aerosol chamber when they pass over leak zones of the filter, whilst on all remaining positions of the filter surface air with a clearly smaller proportion of aerosol particle is sucked through the filter paper from the aerosol chamber 19.

In this way, a leak zone in the filter can for example be so defined that during the scanning the measured value increases to double the value detected in scanning a fault-free filter region. A corresponding threshold value can be set in the particle counters 40 or in the processing electronics connected thereto.

Thus, the particle counters 40 assigned to the respective suction nozzles 31 respond only during the sensing of leak zones in the filter, which together with the respective positional data is reported automatically to the computer 53 having a storage system. These data are processed and stored in the computer 53 in a manner suitable for subsequent indication by the indication unit 54.

If after the end of scanning of the filter to be checked by the scanning unit 29 either the indicator unit 54 is passed across the filter (first variation) or the filter is transferred in its filter frame 12 according to the second described variation beneath the indicator unit 54 into the indicator station 57, the indicator unit 54 can be effective. In this connection, the computer 53 controls the laser indicator 55 to adopt sequentially the positions which correspond to the previously determined leak zones in the filter. These leak zones are thus indicated optically to the user by the laser beam of the laser indicator 55 on the surface of the filter lying beneath the adjustment region of the laser indicator in such manner that the respective surrounding area is illuminated by the laser beam. The illuminated leak zone can then be marked by the user, for example by a temporary insertion of a small flag or the application of other markings. The beam of the laser indicator 55 remains on the respective displayed leak zone until the user causes automatic advance of the laser indicator 55 to the next leak zone stored positionally in the computer 53 by the input of a suitable command into the computer 53.

After the completion of the display process, the checked filter with the marking flags or other markings on the detected leak zones leaves the installation through the output station 8. Thereafter, the previously marked and therefore easily locatable leak zones in the filter are corrected, for example by gluing or casting of the surface regions containing the pinholes, or the filter can be excluded from later use in the event that too many leak zones are detected.

It is adequate if the measurement results delivered by the particle counters 40 are usual digital yes/no signals which lie above or below the set threshold value defining a leak. The exact determination provided by analogue signals is not necessarily required.

The arrangement according to the invention can however also be arranged for the evaluation of analogue signals, possibly without threshold value setting, if in the checking of the filter not only leak zones, in the sense of the above definition, should be detected but permeability values and their distribution across the surface of the filter 13 are to be detected for a more exactly determined efficiency measurement or for the determination of the degree of deposition.

The magnitude of the filter zone sequentially scanned by the suction nozzles 31 is dependent upon the cross section of the nozzle mouths 35 of each suction nozzle. With correspondingly smaller dimensioning of the nozzle mouths 35, the filter surface can be scanned almost point by point.

Self-evidently, also other embodiments of the invention are possible. In particular, to bring about sensing movement between the filter 13 in the sensor unit 29 also the filter can be adjusted relative to the sensor unit.

REFERENCE NUMERAL LIST

| Reference Numeral List | |
|---|---|
| 1 = Housing | 31 = Suction nozzle |
| 2 = Site window | 32 = Nozzle plate |
| 3 = Conveyor belt | 33 = Nozzle plate |
| 4 = Input station | 34 = Nozzle plate |
| 5 = Conveyor belt | 35 = Nozzle mouth region |
| 6 = Drum | 36 = Pipe member |
| 7 = Drum | 37 = Flow channel |
| 8 = Output station | 38 = Vacuum pump |
| 9 = Conveyor belt | 39 = Tygon tube |
| 10 = Scanning station | 40 = Particle counter |

Reference Numeral List

| | | | |
|---|---|---|---|
| 11 = | Filter receiver | 41 = | Frame |
| 12 = | Filter frame | 42 = | Hollow cylindrical bearing |
| 13 = | Filter | | |
| 14 = | Conveying and tensioning unit | 43 = | Hollow cylindrical bearing |
| 15 = | Conveying and tensioning unit | 44 = | Tubular rail |
| | | 45 = | Tubular rail |
| 16 = | Conveyor belt | 46 = | Electromotor |
| 17 = | Conveyor belt | 47 = | Rail |
| 18 = | D.C. Motor | 48 = | Rail |
| 19 = | Aerosol chamber | 49 = | Vertical guide |
| 20 = | Aerosol feed channel | 50 = | Vertical guide |
| 21 = | Air suction pipe | 51 = | Protective conduit |
| 22 = | Particle filter | 52 = | Control consul |
| 23 = | Aerosol inlet | 53 = | Computer |
| 24 = | Aerosol generator | 54 = | Indicator unit |
| 25 = | Discharge chamber | 55 = | Laser pointer |
| 26 = | Radial ventilator | 56 = | Linear stand |
| 27 = | Particle filter | 57 = | Indicator station |
| 28 = | Changeover flap | 58 = | Control consul |
| 29 = | Scanning unit | | |
| 29a = | Scanning unit in Parkposition | | |
| 30 = | Nozzle plate | | |

I claim:

1. Method for checking filters for permeability, in particular for the presence of leaky or other faulty zones which have increased permeability in comparison with other filter regions for particles to be filtered from an air or gas flow, in which method: air or gas charged with said particles is applied to one surface of the filter; the opposite surface of the filter is scanned with an indicator system for indicating the penetration of particles by regional scanning performed by means of a plurality of suction nozzles, operating simultaneously, each scanning a given zone of the filter surface in a region; upon entry of a particle flow into each suction nozzle, a measuring device arranged beyond the flow path is separately influenced by the particle flow for each given zone within said scanned region; and the result for each zone within said scanned region emitting a particle flow is separately indicated.

2. Method according to claim 1 wherein the given zones within said scanning regions are approximately in the form of a point.

3. Method according to claim 1 wherein the results for the given zones within the scanned regions emitting a particle flow together with positional data relating to the given zones are stored in a memory device connected to the indicator system.

4. Method according to claim 3 wherein the stored results and data for the individual given zones emitting a particle flow are brought to the indicator system in sequence.

5. Method according to claim 1 wherein the indication of the given zones within the scanned regions emitting a particle flow is achieved by a light indicator controlled by the measurement results and positional data relating to the given zones.

6. Method according to claim 5 wherein the indication is performed by the light indicator on the scanned filter surface.

7. Method according to claim 1 wherein an aerosol is used for producing a particle flow.

8. Apparatus for checking filters for permeability comprising: a scanning station having an aerosol chamber and a scanning unit responsive to an aerosol flow and suitable for regional scanning of a surface; and a receiver arranged to carry a filter having a surface to be checked in a position between said chamber and said scanning unit, said scanning unit comprising a plurality of suction nozzles disposed next to each other along an X-coordinate axis, each nozzle having a mouth confronting a given zone in a region of the scanned surface, means to displace said plurality of nozzles relative to said scanned surface in the direction of a Y-coordinate axis to confront an adjacent region, a measuring device for each nozzle to measure the particle flow through said given zone, and means to detect the X and Y position of any given zone having particle flow therethrough.

9. Apparatus according to claim 8 wherein the measuring device for each suction nozzle comprises a particle counter connected thereto.

10. Apparatus according to claim 8 wherein said plurality of suction nozzles are provided on a filter plate and each suction nozzle is connected to a separate particle counter comprising said measuring device.

11. Apparatus according to claim 10 wherein said suction nozzles and particle counters are arranged on a common carrier adjustable in said direction of the Y-coordinate axis to scan a part of said surface and also adjustable in the direction of the X-coordinate to scan an adjoining part of said surface.

12. Apparatus according to claim 8 wherein the measuring devices are condensation nucleus counters.

13. Apparatus according to claim 8 including a memory device, wherein the measuring device and position detection means produce data outputs connected to provide data input to said memory device.

14. Apparatus according to claim 13 including an indicator unit which is controlled by the memory device.

15. Apparatus according to claim 14 wherein the indicator unit comprises a laser indicator.

16. Apparatus according to claim 14 wherein the indicator unit is operable to produce an indication on the surface of the filter.

17. Apparatus according to claim 16 including means to adjustably position the scanning unit and the indicator unit alternately across the scanned surface in the scanning station.

18. Apparatus according to claim 17 wherein the positioning means movably positions the scanning unit and the indicator unit alternately between working and park positions.

19. Apparatus according to claim 14 including means to bring the filter into an indicator station having a light indicator in the path of the light beam.

20. Apparatus according to claim 8 including a filter frame for transporting the filter through the scanning unit.

* * * * *